(12) United States Patent
Rose (10) Patent No.: US 9,652,164 B2
(45) Date of Patent: May 16, 2017

(54) SOLID-STATE MASS STORAGE DEVICE AND METHOD FOR PROCESSING FORCED UNIT ACCESS WRITE COMMANDS

(71) Applicant: OCZ Storage Solutions Inc., San Jose, CA (US)

(72) Inventor: Philip David Rose, Islip (GB)

(73) Assignee: Toshiba Corporation, Tokyo (JP)

( * ) Notice: Subject to any disclaimer, the term of this patent is extended or adjusted under 35 U.S.C. 154(b) by 26 days.

(21) Appl. No.: 14/712,315

(22) Filed: May 14, 2015

(65) Prior Publication Data

US 2016/0335006 A1    Nov. 17, 2016

(51) Int. Cl.
G06F 3/06 (2006.01)

(52) U.S. Cl.
CPC ............ *G06F 3/0619* (2013.01); *G06F 3/061* (2013.01); *G06F 3/0655* (2013.01); *G06F 3/0688* (2013.01)

(58) Field of Classification Search
CPC ..... G06F 3/0619; G06F 3/0655; G06F 3/0688
See application file for complete search history.

(56) References Cited

U.S. PATENT DOCUMENTS

| 7,774,540 | B2 | 8/2010 | Han et al. |
| 8,768,890 | B2 | 7/2014 | Burchall et al. |
| 2004/0054851 | A1* | 3/2004 | Acton ............... G06F 11/1441 711/118 |
| 2015/0029808 | A1* | 1/2015 | Allison ............... G11C 5/005 365/227 |
| 2016/0147671 | A1* | 5/2016 | Vishne ............... G06F 12/12 711/135 |

OTHER PUBLICATIONS

Force Unit Access Proposal, 4 Pages (Dec. 12, 2001).

* cited by examiner

*Primary Examiner* — Edward Dudek, Jr.
(74) *Attorney, Agent, or Firm* — White & Case LLP (57) ABSTRACT

Mass storage devices and methods of operating thereof adapted for use with a host and for storing data thereof includes at least one non-volatile memory for storing the data, at least one volatile memory, a memory controller configured for reading and writing the data and metadata to and from the non-volatile memory and the volatile memory, and an auxiliary power supply, wherein the memory controller locates the data on the non-volatile memory with the metadata. When processing a write command that requires all data to be written to the non-volatile memory before confirmation is returned to the host computer system that the write command has succeeded, the mass storage device is configured to write the data to the non-volatile memory, write the metadata to the volatile memory, and once the both data and metadata are written, return a completion status of the write command to the host computer system.

21 Claims, 5 Drawing Sheets

SOLID-STATE MASS STORAGE DEVICE AND METHOD FOR PROCESSING FORCED UNIT ACCESS WRITE COMMANDS

BACKGROUND OF THE INVENTION

The present invention generally relates to memory devices for use with computers and other processing apparatuses. More particularly, the present invention relates to solid-state mass storage drives and methods for improving write performance while maintaining data integrity in the event of a power failure.

Non-volatile solid-state memory technologies used with computers and other processing apparatuses (host computer systems) are currently largely focused on NAND flash memory technologies, with other emerging non-volatile solid-state memory technologies including phase change memory (PCM), resistive random access memory (RRAM), magnetoresistive random access memory (MRAM), ferromagnetic random access memory (FRAM), organic memories, and nanotechnology based storage media such as carbon nanofiber/nanotube-based substrates. These and other non-volatile solid-state memory technologies will be collectively referred to herein as solid-state mass storage media. Mainly for cost reasons, at present the most common solid-state memory technology used in solid-state drives (SSDs) are NAND flash memory components, commonly referred to as flash-based memory devices, flash-based storage devices, flash-based media, or raw flash.

Figure 1:
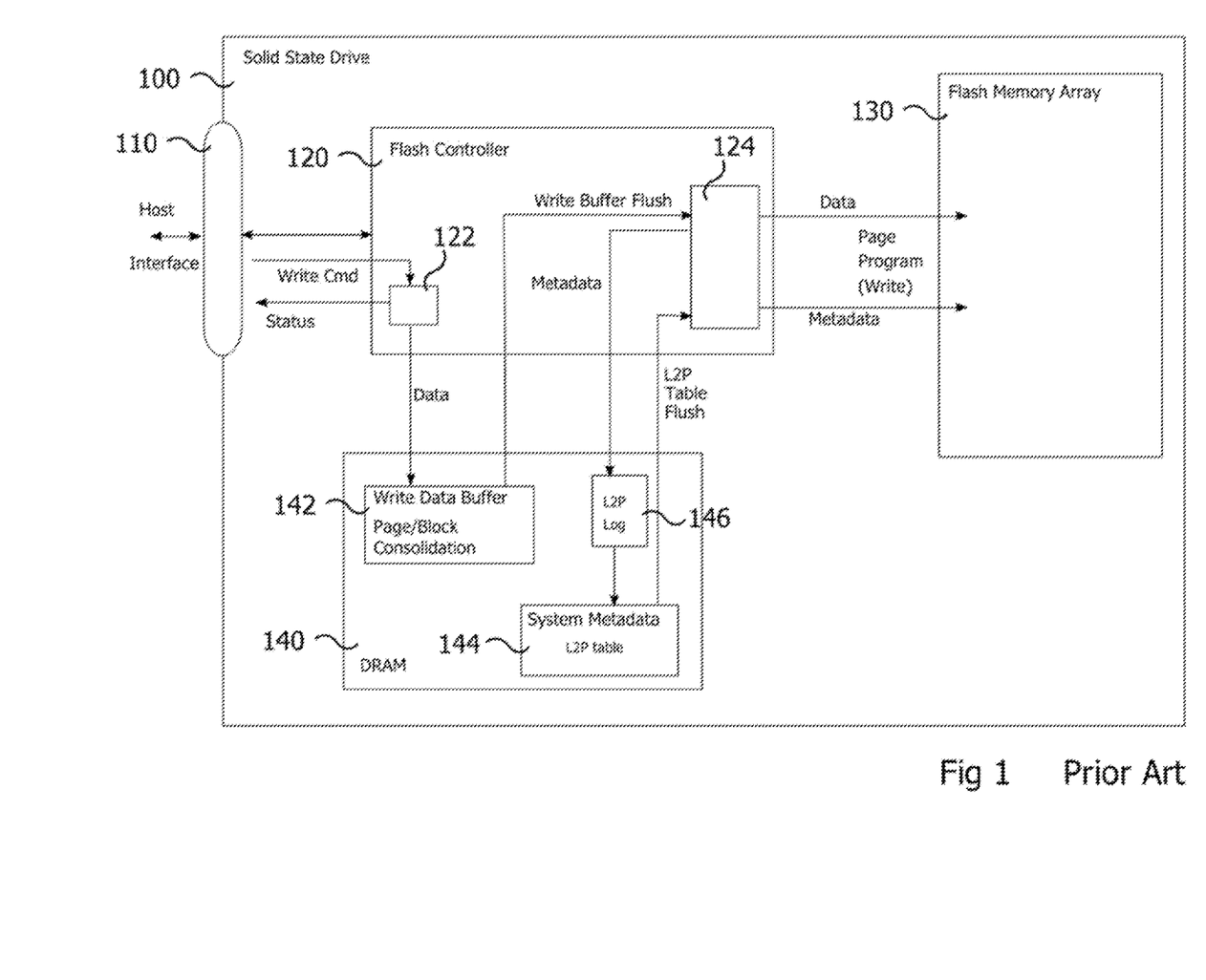
FIGS. 1 and 2 represent a standard write command and an FUA write command, respectively, being processed by an SSD of a type known in the art.

Due to the requirement to present an SSD as though it were a traditional hard disk drive, a memory controller is required to perform a translation of the hard disk protocols to instructions to read and write the memory of the SSD. This operation requires a memory controller to use large translation and mapping tables and other metadata to assist in this process. FIG. 1 represents a write command being implemented on an SSD 100 of a type known in the art. SSD 100 includes an interface 110 for communicating with a host computer system (not shown), a memory controller 120, a volatile memory 140 used as a buffer, and a non-volatile NAND flash-based memory array 130. The write command is represented as being received by the controller 120 from the host computer system at the command handler 122. The controller 120 writes the command and accompanying data to a write buffer 142 of the volatile memory 140 and a completion status of the command is immediately returned by the command handler 122 to the host computer system. Subsequently, the write buffer 142 of the volatile memory 140 is flushed and a NAND channel controller 124 of the memory controller 120 issues memory page program commands to the NAND flash-based memory array 130. Notably, a single write command from the host computer system may result in the programming of multiple pages in multiple NAND flash memory components and/or dies within the memory array 130. When the memory page program commands have completed, metadata (essentially the physical locations corresponding to the logical locations that the host computer system command specified) is written to a Logical to Physical (L2P) log 146 in the volatile memory 140. The L2P log 146 is used to update an L2P table copy 144 held in the volatile memory 140. The L2P table copy 144 comprises metadata entries identifying the logical to physical locations of the data in the memory array 130.

For reasons of speed and performance, translation and mapping tables and other metadata used by the memory controller 120 are normally read from the memory array 130 of the SSD 100 at initial power-on, then stored in the L2P table copy 144 of the volatile memory 140. In order not to affect performance, the data in the L2P table copy 144 is only periodically flushed back to the memory array 130 during operation, and again when the SSD 100 is properly shut down. Depending on the specific SSD and/or the situation, either the whole L2P table copy may be flushed to the memory array or merely entries in the L2P table copy that have not yet been saved to the memory array may be flushed to the memory array.

The SSD 100 is therefore exposed to a window of time wherein the data and the translation and mapping tables and metadata in the non-volatile memory array 130 are not consistent. If the power to the SSD 100 were to be suddenly removed during this time, the up-to-date translation/mapping tables and metadata in the volatile memory 140 may be lost and unrecoverable. The result may be that when the SSD 100 next powers up, it may not be possible to reconcile the data and translation/mapping tables and metadata stored in the memory array 130 of the SSD 100, and data may be lost.

Various measures have been implemented in the art to protect important data from being lost in the event of a power failure as described above. In particular, Force Unit Access (FUA) is an I/O write command where the storage device must ensure that the data (and any metadata necessary to subsequently read the data) has been written to the non-volatile memory before the command completes, that is, returns a completion status to the host computer system. Therefore, data written by a completed FUA write command is on permanent media even if the storage device is powered off before flushing the volatile memory. FUA write commands are typically used by the journaling file system of the host computer system's operating system to ensure that the file system remains in a self-consistent state in the event of a sudden power loss.

Figure 2:
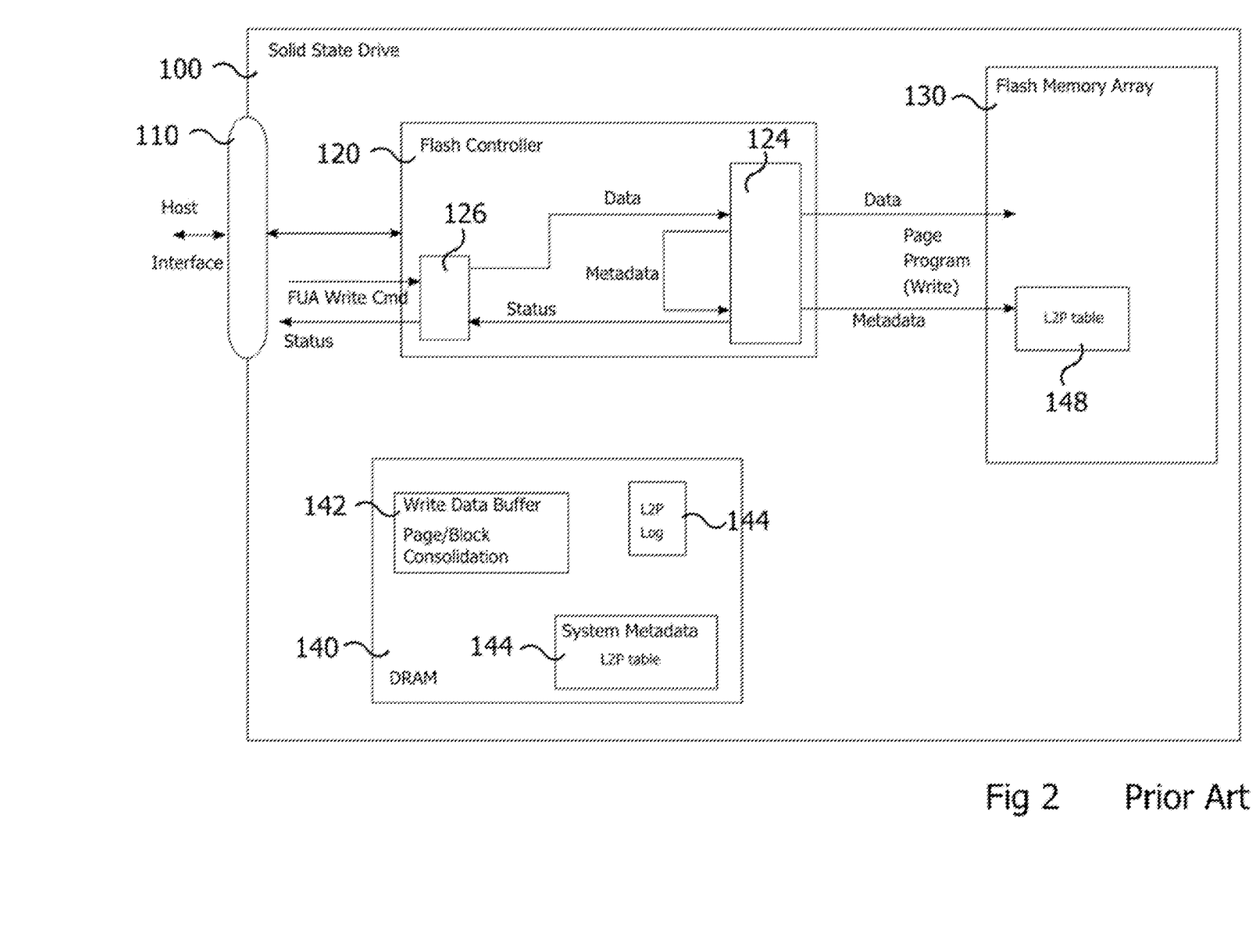

FIG. 2 represents the SSD 100 receiving an FUA write command. As represented, the command handler 126 will cause the data from the FUA write command to be directed to the NAND channel controller 124. Although not shown for clarity, the FUA write command may be temporarily staged or buffered via the volatile memory 140, though for immediate processing and not for later processing as would occur in the case of a standard write. When the memory page program commands complete, the metadata is immediately updated in an L2P table 148 stored in the memory array 130 (although not shown for clarity, the metadata may also be updated in the L2P table 144). Only when the data and the updates to the L2P table 148 have completed is the completion status returned to the host computer system by the command handler 126.

In an SSD that receives an FUA write command, in order to ensure that the data is stored in the non-volatile media, two events have to occur. First, the data must be written to the non-volatile storage media (for example, memory array 130). Second, the L2P table (for example, the L2P table 148) must be updated to define the location of the new data on the non-volatile storage media. Since each of these two events individually require at least one flash page to be written, the latency of the FUA write command will be at least two flash page write times (typically 1-3 ms each). As such, FUA write commands sacrifice operating speed for security of the data. In addition, when multiple write commands, including both FUA and regular, non-FUA write commands, are being processed by an SSD, it can be difficult to track which updates to the L2P table copy have been flushed and to which individual FUA write command they pertain.

In view of the above, it can be appreciated that there are certain problems, shortcomings or disadvantages associated with the prior art, and that it would be desirable if methods and systems were available for processing FUA write commands and/or similar commands while reducing or eliminating the negative impact on write performance and reducing the complexity of tracking updates to the L2P table copy.

BRIEF DESCRIPTION OF THE INVENTION

The present invention provides solid-state mass storage media and methods of operating thereof suitable for improving write performance while maintaining data integrity in the event of a power failure by processing FUA write commands and/or similar commands while reducing or eliminating the negative impact on write performance and reducing the complexity of tracking updates to the L2P map.

According to one aspect of the invention, a solid-state mass storage device adapted for use with a host computer system and for storing data thereof includes a host interface for communicating with the host computer system, at least one non-volatile memory for storing the data, at least one volatile memory for buffering data and metadata, a memory controller configured for reading the data and metadata from and writing the data and metadata to the non-volatile memory and the volatile memory, and an auxiliary power supply, wherein the memory controller identifies the location of the data on the non-volatile memory with the metadata. When processing a forced unit access (FUA) write command, the mass storage device is configured to write the data to the non-volatile memory, write the metadata to the volatile memory, and once the data is written to the non-volatile memory and the metadata is written to the volatile memory immediately return a completion status of the FUA write command to the host computer system. In the event of a power failure of a primary power source that powers the mass storage device, the auxiliary power supply is configured to provide power to the mass storage device for a time period sufficient to flush the metadata from the volatile memory to the non-volatile memory, and the mass storage device is configured to flush the metadata from the volatile memory to the non-volatile memory during the time period.

According to another aspect of the invention, a method of operating a solid-state mass storage device includes receiving a forced unit access (FUA) write command from a host computer system, writing data to at least one non-volatile memory and writing metadata relating to the location of the data on the non-volatile memory to at least one volatile memory, and returning a completion status of the FUA write command to the host computer system as soon as both the data is written to the non-volatile memory and the metadata is written to the volatile memory.

According to another aspect of the invention, a mass storage device adapted for use with a host computer system and for storing data thereof includes a host interface for communicating with the host computer system, at least one non-volatile memory for storing the data, at least one volatile memory for buffering the data and metadata identifying the location of the data on the non-volatile memory, a memory controller configured for reading the data and metadata from and writing the data and metadata to the non-volatile memory and the volatile memory, and an auxiliary power supply, wherein the memory controller identifying the location of the data on the non-volatile memory with the metadata. When processing a write command that requires all data to be written to the non-volatile memory before confirmation is returned to the host computer system that the write command has succeeded, the mass storage device is configured to write the data to the non-volatile memory, write the metadata to the volatile memory, and once both the data is written to the non-volatile memory and the metadata is written to the volatile memory immediately return a completion status of the write command to the host computer system. In the event of a power failure of a primary power source that powers the mass storage device, the auxiliary power supply is configured to provide power to the mass storage device for a time period sufficient to write the metadata from the volatile memory to the non-volatile memory, and the mass storage device is configured to write the metadata from the volatile memory to the non-volatile memory during the time period.

A technical effect of the invention is that when processing a FUA write command operating speeds are improved and complexity is reduced. In particular, it is believed that, by returning a completion status to the host computer system as soon as both the data accompanying the FUA write command is stored in the non-volatile media and the metadata is stored in the volatile memory, the time to completion of the command is reduced since the system does not have to wait for the write time required to store the metadata to the non-volatile media. In addition, the complexity of the FUA write command process is reduced as unflushed updates in the metadata stored in the volatile memory do not have to be tracked in order to determine when the FUA write command is complete.

Other aspects and advantages of this invention will be better appreciated from the following detailed description.

DETAILED DESCRIPTION OF THE INVENTION

The current invention is generally directed to improving processes for handling FUA write commands in NAND flash-based SSDs (or any other solid-state storage media with similar behavioral characteristics). Of particular importance is reducing the complexity involved in tracking which updates to a L2P table copy in a volatile memory have been flushed and to which commands they relate. Although the invention will be explained in reference to NAND flash-based SSDs in general, it will be appreciated that aspects of the invention are equally applicable to multiple storage protocols such as SATA, Non-volatile Memory Express (NVMe), Advanced Host Controller Interface (MCI), and Serial Attached SCSI (SAS), in particular where a logical-to-physical map exists to determine the position of the data on the physical media and where a type of write command is used which requires all data to be written to the storage media before confirmation is returned that the command has succeeded.

Figure 3:
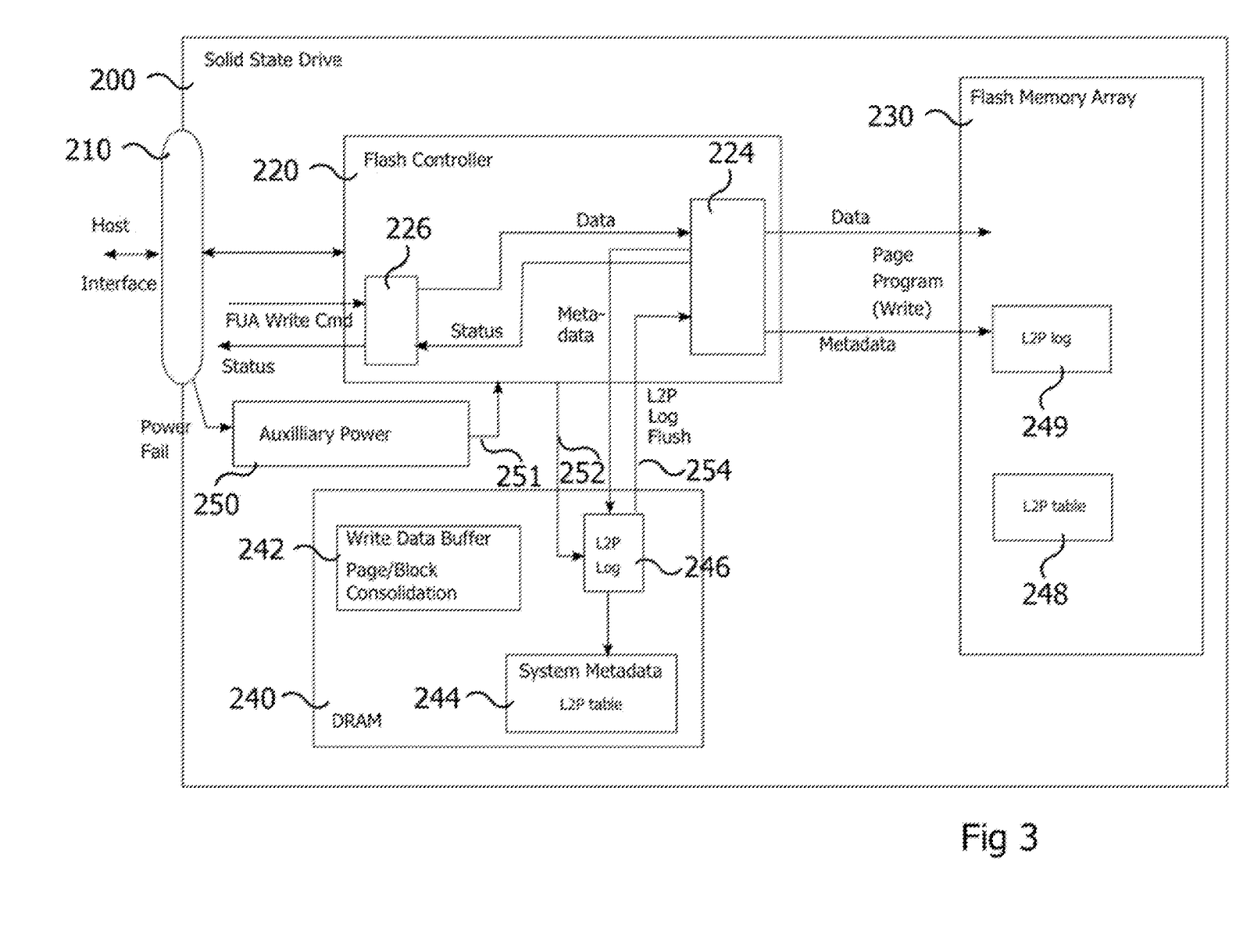
FIG. 3 represents an FUA write command being processed in an SSD in accordance with aspects of the present invention.

FIG. 3 represents an FUA write command being processed in a SSD in accordance with an aspect of the invention. SSD 200 comprises a substrate having thereon an interface 210 for communicating with a host computer system (not shown), a memory controller 220, a volatile memory 240, and a non-volatile NAND flash-based memory array 230. Upon receiving the FUA write command, a command controller 226 of the memory controller 220 labels the command with a flag indicating that it is an FUA write command. Since the command has the FUA flag, a completion status is not sent to the host computer system when the data is complete in the volatile memory 240 (as it would be for a standard write command). The FUA write command is forwarded to a NAND channel controller 224. A Flash Translation Layer (FTL) of the command controller 226 reads the FUA write command, forms one or more memory page program commands, and processes the memory page program commands to the memory array 230. Depending on the specific application, hardware, and software used, it is possible that the data may first be buffered or staged in the volatile memory 240; however, the data is not buffered in the volatile memory 240 for any appreciable time but instead is written immediately to the memory array 230 as required by the FUA write command. Concurrently, completions of these memory page program commands are counted and recorded. The NAND channel controller 224 writes metadata relating to the memory page program commands for the new data to a Logical to Physical (L2P) log 246 in the volatile memory 240. The L2P log 246 is used to update an L2P table copy 244 held in the volatile memory 240. Since the command has the FUA flag, a completion status is not sent to the host computer system when the data is complete in the volatile memory 240 (as it would be for a standard write command). Once all of the memory page program commands are successfully completed and the updates to the L2P log 246 are written, a completion status for the FUA write command is scheduled for transmission back to the host computer system. Notably, the completion status is returned to the host computer system regardless of whether the updated metadata entries have been flushed to the memory array 230, and most likely, will be returned prior to the metadata being flushed to the memory array 230. Assuming there is no intervening power failure, the outstanding updates to the L2P log 246 and the L2P table copy 244 will subsequently flush as with a standard write command. How and when the metadata is flushed from the volatile memory 240 during normal operation may vary depending on the SSD or the memory controller used. For example, in some cases, entries in the L2P log 246 are applied to the L2P table copy 244 and then occasionally the complete L2P table copy is flushed to NAND. In other memory controllers, to reduce the amount of data written, only the updated entries in the L2P table copy 244 are flushed to the memory array 230, but then after a certain amount of updates, the full L2P table copy 244 is flushed to the memory array 230 to provide a known complete checkpoint.

If a power failure from a main power source (not shown) to the SSD 200 is detected, an auxiliary power supply or module 250 will notify 251 the flash controller 220 and the controller 220 will immediately request a flush 252 of the L2P log 246 thereby causing any outstanding entries in the L2P log 246 to be read 254 by the NAND controller 224 and written to an L2P log 249 in the memory array 230. The auxiliary power module 250 is configured to provide power to the SSD 200 for a time period that is sufficient such that a largest possible amount of outstanding (i.e., not backed up to the memory array 230) entries in the L2P log 246 can be guaranteed to proceed to completion, that is, successfully written to the memory array 230, even after the main power source has failed. According to a preferred aspect of the invention, the auxiliary power module 250 is configured to provide power to the SSD 200 for a time period sufficient such that any outstanding entries in the L2P log 246 can be written to the memory array 230 after failure of the main power source, but, for cost and physical space considerations, is not capable of providing power to the SSD 200 for a time period sufficient to also write outstanding data and/or the complete L2P table copy 244 from the volatile memory write buffer 242 and L2P table copy 244 to the memory array 230. The auxiliary power module 250 may be any power source known in the art, preferably an onboard battery or capacitor-based keep-alive power supply located on the substrate of the SSD 200 and integrated with the circuitry thereof. Once all outstanding entries in the L2P log 246 have been written to the memory array 230, or alternatively at least all of the outstanding entries in the L2P log 246 pertaining to FUA write commands, the memory controller 220 may properly power down without the data, translation and mapping tables, and metadata potentially being lost.

In order to ensure that the SSD 200 can correctly handle future FUA write commands after the main power source is re-applied, the command controller 226 may be configured to reject (for example, by returning an error status) or delay sending a completion status until the auxiliary power module 250 indicates that it has been recharged with sufficient power to allow the SSD 200 to complete flushing updates in the L2P log 246 to the memory array 230.

When power is re-applied to the SSD 200 from the main power source, the SSD firmware reads the last complete L2P table 248 in the memory array and applies changes from the L2P log 249 stored on the memory array 230. At some time thereafter, if the host computer system issues a read command for the data written using the FUA write command immediately before the power failure, the correct data is transferred from the SSD 200 to the host computer system as the data and metadata for the FUA write command are matching and complete.

Figure 4:
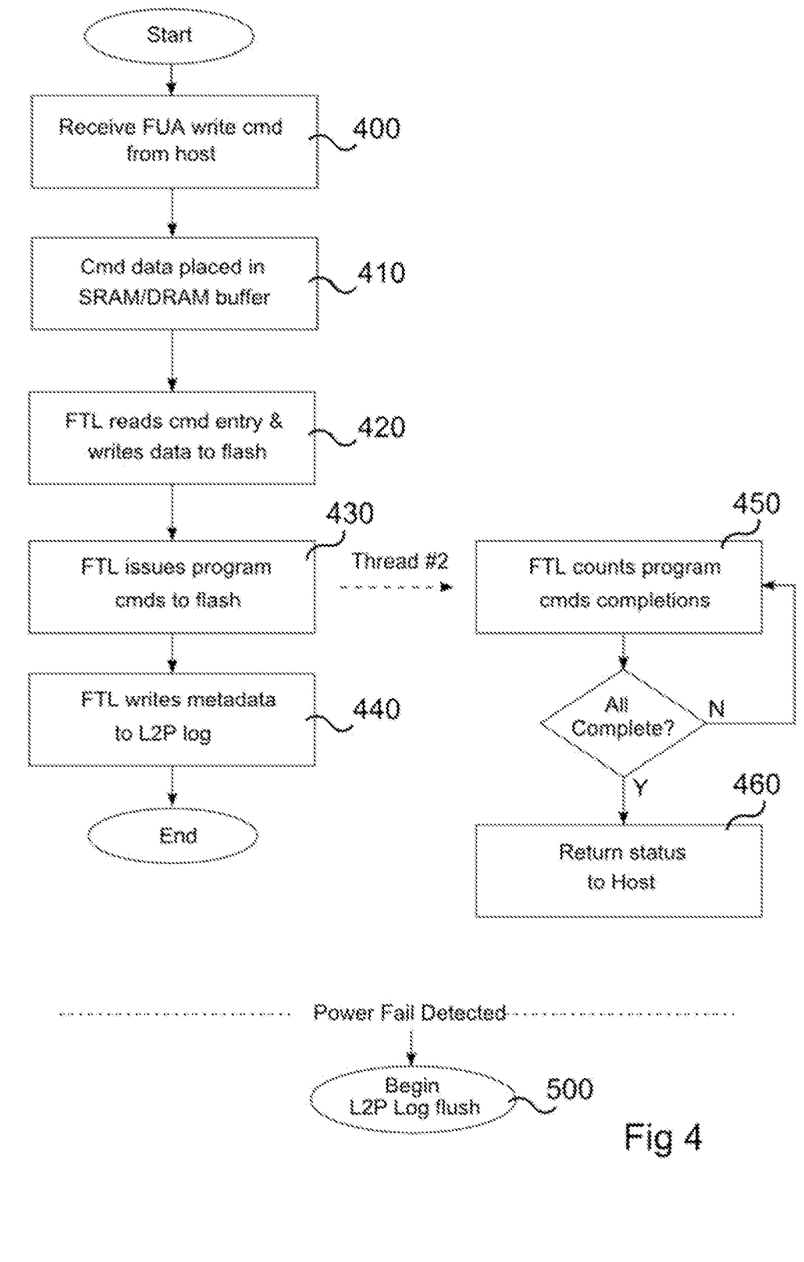
FIG. 4 is a flow chart representing a method of processing an FUA write command in accordance with aspects of the present invention.

FIG. 4 is a flow chart representing the FUA write command processing from reception to completion. As represented, the SSD 200 receives an FUA write command from the host at 400. At 410, the FUA write command data is stored in the volatile memory 240. At 420, the FTL reads the command and writes the data to the memory array 230. At 430, the FTL issues memory page program commands to the memory array 230. At 440, the FTL writes the metadata to the L2P log in the volatile memory 240. At 450, the FTL counts the memory page program commands that have completed and, if all outstanding memory page program commands are complete, a completion status is returned to the host computer system at 460. Subsequently, if a power fail is detected, at 500 the FTL begins the process to flush the L2P log 246 in the volatile memory 230 to the L2P log 249 in the flash memory array 230 (shown in more detail in FIG. 5).

Figure 5:
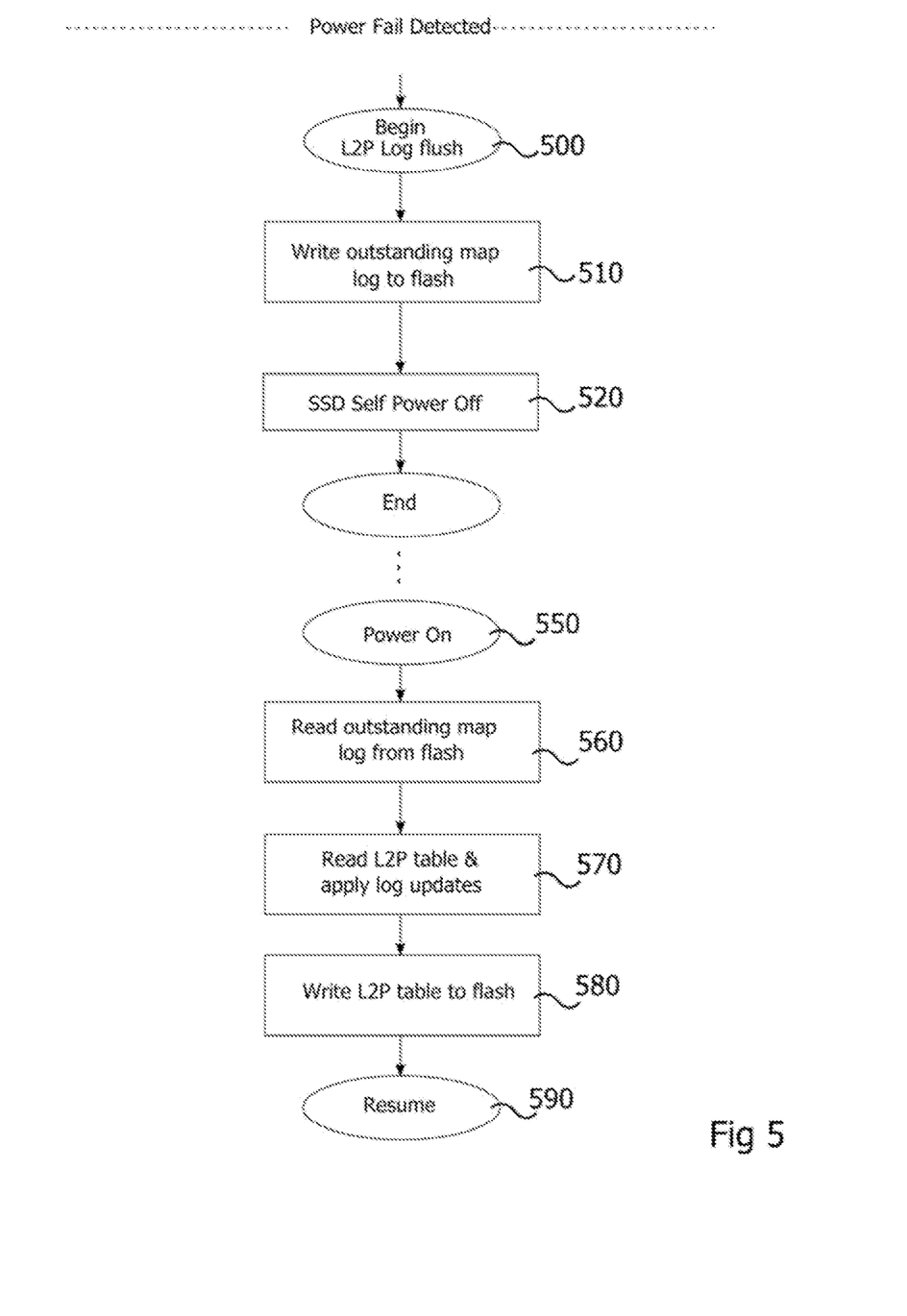
FIG. 5 is a flow chart representing a method of securing metadata in the event of a power failure and recovery of the metadata at restart in accordance with aspects of the present invention.

FIG. 5 is a flow chart representing translation and mapping tables and metadata backup during a power failure and recovery of the translation and mapping tables and metadata at restart. As represented, upon detection of a power failure of the primary power source, the SSD 200 begins a flush of the L2P log 246 at 500. The outstanding updates in the L2P log 246 in volatile memory 230 are written to the L2P log 249 in the memory array 230 at 510 and then the SSD 200 may power off at 520. Upon restart of the SSD 200 at 550, the outstanding updates in the L2P log 249 may be read back from the memory array 230 and written to the L2P log 246 in the volatile memory 240 at 560. Thereafter, the L2P table 248 may be read and written to L2P table copy 244 in volatile memory 240, and then updates from the L2P log 246 may be applied to the L2P table copy 244 at 570. At 580 the updated L2P table copy 244 is written to the L2P table 248 in the memory array 230 and normal operation of the SSD 200 is resumed at 590.

As stated previously, in conventional processing of FUA write commands, the host computer system is not notified of a completion status until after the L2P table has been updated in the non-volatile media. Consequently, while multiple FUA write commands are outstanding in the storage device, a potentially large number of L2P table updates must be correlated to individual FUA write commands that have been executed. However, since in aspects of the present invention the L2P table flush occurs after the host computer system has been notified that both the data has been written to the memory array 230 and the metadata has been written to the volatile memory 240, the processing of FUA write commands is simplified in that, when multiple FUA write commands are outstanding on the SSD 200, a large number of L2P table updates do not need to be correlated to individual FUA write commands that have been executed. This allows for significant simplification of the FTL firmware as it is not necessary to track each outstanding FUA write command's status in the L2P table copy or L2P log.

Additional benefits include a reduction in excess latency of FUA write commands, particularly 4 KB writes to random logical block addresses (LBAs), since the process no longer requires an extra penalty of writing the L2P table updates in the non-volatile media prior to completion of the FUA write command. While the SSD 200 requires an auxiliary power module 250, power backup requirements are minimized by needing only to flush outstanding metadata in the event of a power outage, rather than both the metadata and the data.

While the invention has been described in terms of specific embodiments, it is apparent that other forms could be adopted by one skilled in the art. For example, the physical configuration of the SSD 200 could differ from that shown, and commands and processes other than those noted could be used. While the invention has been described in reference to NAND SSDs, it is foreseeable that aspects of the present invention may be applicable to any non-volatile storage media where a logical-to-physical map exists to determine the physical position of data on the storage media and where a type of write command is used which requires all data to be written to the storage media before confirmation is returned that the command has succeeded. Therefore, the scope of the invention is to be limited only by the following claims.

The invention claimed is:

1. A solid-state mass storage device adapted for use with a host computer system and for storing data thereof, the mass storage device comprising:
   a host interface for communicating with the host computer system;
   at least one non-volatile memory for storing the data;
   at least one volatile memory for buffering data and metadata;
   a memory controller configured for reading the data and metadata from and writing the data and metadata to the non-volatile memory and the volatile memory, the memory controller identifying the location of the data on the non-volatile memory with the metadata; and
   an auxiliary power supply;
   wherein when processing a forced unit access (FUA) write command, the mass storage device is configured to write the data to the non-volatile memory, write the metadata to the volatile memory, and once the data is written to the non-volatile memory and the metadata is written to the volatile memory immediately return a completion status of the FUA write command to the host computer system,
   wherein in the event of a power failure of a primary power source that powers the mass storage device, the auxiliary power supply is configured to provide power to the mass storage device for a time period sufficient to flush the metadata from the volatile memory to the non-volatile memory, and the mass storage device is configured to flush the metadata from the volatile memory to the non-volatile memory during the time period.

2. The mass storage device of claim 1, wherein when processing the FUA write command the data is written to the volatile memory in addition to the non-volatile memory, and the auxiliary power supply is not capable of providing power to the mass storage for a time period sufficient to flush the data from the volatile memory to the non-volatile memory.

3. The mass storage device of claim 1, wherein the mass storage device is configured to return the completion status of the FUA write command to the host computer system once the data is written to the non-volatile memory and metadata to the volatile memory even if the metadata is not written to the non-volatile memory.

4. The mass storage device of claim 1, wherein the mass storage device is configured to return the completion status of the FUA write command to the host computer system before the metadata is flushed from the volatile memory to the non-volatile memory due to normal operation of the mass storage device.

5. The mass storage device of claim 1, wherein the auxiliary power supply is configured to provide power to the mass storage device for a time period sufficient to flush a largest possible amount of unflushed metadata stored in the volatile memory to the non-volatile memory.

6. The mass storage device of claim 1, wherein in the event of power being restored to the mass storage device after the power failure, the mass storage device is configured to use the metadata flushed to the non-volatile memory in response to the power failure to correctly read data written by an FUA write command to the non-volatile memory prior to the power failure.

7. The mass storage device of claim 1, wherein in the event of power being restored to the mass storage device after the power failure, the auxiliary power supply is configured to recharge such that power may be provided from the auxiliary power supply to the mass storage device for a time period sufficient to flush the metadata from the volatile memory to the non-volatile memory, and the mass storage device is configured to reject or delay FUA write commands received by the mass storage device until the auxiliary power supply is recharged.

8. The mass storage device of claim 1, wherein the non-volatile memory is a NAND flash-based memory device.

9. The mass storage device of claim 1, wherein the auxiliary power supply is located on and integrated with a substrate of the mass storage device.

10. A method of operating the mass storage device of claim 1, the method comprising:
   receiving the FUA write command from the host computer system;

writing the data to the non-volatile memory and writing the metadata to the volatile memory; and returning the completion status of the FUA write command to the host computer system as soon as both the data is written to the non-volatile memory and the metadata is written to the volatile memory.

11. The method of claim 10, further comprising:

detecting the power failure from the main power source to the mass storage device;

powering the mass storage device with the auxiliary power supply for the time period sufficient to flush the metadata from the volatile memory to the non-volatile memory; and flushing the metadata from the volatile memory to the non-volatile memory before the mass storage device powers down.

12. A method of operating a solid-state mass storage device, the method comprising:

receiving a forced unit access (FUA) write command from a host computer system;

writing data to at least one non-volatile memory and writing metadata relating to the location of the data on the non-volatile memory to at least one volatile memory; and returning a completion status of the FUA write command to the host computer system as soon as the data is both written to the non-volatile memory and metadata written to the volatile memory.

13. The method of claim 12, further comprising flushing the metadata from the volatile memory to the non-volatile memory after the completion status of the FUA write command is returned to the host computer system.

14. The method of claim 12, wherein the completion status of the FUA write command is returned to the host computer system even if the metadata is not written to the non-volatile memory.

15. The method of claim 12, wherein the non-volatile memory is a NAND flash-based memory device.

16. The method of claim 12, further comprising:

detecting a power failure from a main power source to the mass storage device;

powering the mass storage device with an auxiliary power supply for a time period sufficient to flush the metadata from the volatile memory to the non-volatile memory; and flushing the metadata from the volatile memory to the non-volatile memory before the mass storage device powers down.

17. The method of claim 16, wherein a time period between the detection of the power failure and the mass storage device powering down is shorter than a time period sufficient to flush the data to the non-volatile memory.

18. The method of claim 16, wherein the metadata comprises entries in a logical-to-physical log that is used to update a logical-to-physical table copy in the volatile memory.

19. The method of claim 16, further comprising:

restoring power to the mass storage device after the power failure; and using the metadata flushed to the non-volatile memory to correctly read data written by an FUA write command to the non-volatile memory prior to the power failure.

20. The method of claim 16, further comprising:

restoring power to the mass storage device after the power failure;

recharging the auxiliary power supply such that power may be proved from the auxiliary power supply to the mass storage device for a time period sufficient to flush the metadata from the volatile memory to the non-volatile memory; and rejecting or delaying FUA write commands received by the mass storage device until the auxiliary power supply is recharged.

21. A mass storage device adapted for use with a host computer system and for storing data thereof, the mass storage device comprising:

a host interface for communicating with the host computer system;

at least one non-volatile memory for storing the data;

at least one volatile memory for buffering the data and metadata identifying the location of the data on the non-volatile memory;

a memory controller configured for reading the data and the metadata from and writing the data and metadata to the non-volatile memory and the volatile memory, the memory controller identifying the location of the data on the non-volatile memory with the metadata; and an auxiliary power supply;

wherein when processing a write command that requires all data to be written to the non-volatile memory before confirmation is returned to the host computer system that the write command has succeeded, the mass storage device is configured to write the data to the non-volatile memory, write the metadata to the volatile memory, and once both the data is written to the non-volatile memory and the metadata is written to the volatile memory immediately return a completion status of the write command to the host computer system, wherein in the event of a power failure of a primary power source that powers the mass storage device, the auxiliary power supply is configured to provide power to the mass storage device for a time period sufficient to write the metadata from the volatile memory to the non-volatile memory, and the mass storage device is configured to write the metadata from the volatile memory to the non-volatile memory during the time period.

* * * * *